United States Patent [19]

Casey

[11] Patent Number: 4,589,849
[45] Date of Patent: May 20, 1986

[54] DEXTERITY EVALUATION APPARATUS

[75] Inventor: James E. Casey, Lemont, Ill.

[73] Assignee: Kelly Services, Inc., Troy, Mich.

[21] Appl. No.: 726,011

[22] Filed: Apr. 22, 1985

[51] Int. Cl.$^4$ .............................................. G09B 9/00
[52] U.S. Cl. ................................ 434/258; 273/1 GC; 273/1 GE; 434/224
[58] Field of Search ................ 434/258, 260, 261, 219, 434/224, 367, 369, 247, 255; 273/1 G, 1 GC, 1 GE, 1 E

[56] References Cited

U.S. PATENT DOCUMENTS

| | | | |
|---|---|---|---|
| 2,893,137 | 7/1959 | Alling et al. | 434/224 |
| 2,917,834 | 12/1959 | Butler et al. | 434/224 |
| 2,945,306 | 7/1960 | Flanagan | 434/258 |
| 3,003,255 | 10/1961 | Katz | 434/258 |
| 3,043,022 | 7/1962 | Crews et al. | 434/224 |
| 3,346,968 | 10/1967 | Dellinger | 434/258 |
| 3,426,450 | 2/1969 | Isenhour | 434/258 |
| 3,455,035 | 7/1969 | Breneman | 434/258 |
| 3,568,335 | 3/1971 | Nehmann et al. | 434/118 |
| 3,581,408 | 6/1971 | Mohier | 434/258 |
| 3,611,588 | 10/1971 | Torretta | 434/258 |
| 3,973,334 | 8/1976 | Sterritt | 434/258 |
| 4,006,539 | 2/1977 | Slomski | 434/258 |
| 4,112,593 | 9/1978 | Hill et al. | 434/224 |
| 4,220,330 | 9/1980 | Montgomery | 273/1 GC |
| 4,541,806 | 9/1985 | Zimmerman et al. | 434/258 |

OTHER PUBLICATIONS

Crissey Dexterity Tester; Orlo L. Crissey, Ph.D.; Copyright 1964, Lafayette Instrument Co., Inc.; p. 3.

Primary Examiner—William H. Grieb
Attorney, Agent, or Firm—Harness, Dickey & Pierce

[57] ABSTRACT

A dexterity evaluation apparatus which provides an indication of an individual's dexterity by determining the amount of time required for an individual to complete the assembly of a circuit on a simulated electronic circuit board in accordance with an adjoining pre-wired circuit. The apparatus includes a simulated electronic circuit panel, electronic circuit components, a timer circuit, and a timer display. To conduct the dexterity evaluation, the timer display count is started, then the evaluation subject assembles the electronic circuit components on the circuit board. When the assembly is complete, the timer display count is automatically stopped. The completed circuit is then compared for accuracy against the pre-wired circuit and the elapsed time recorded. The results provide an indication of the individual's dexterity for the purpose of monitoring training progress or employment screening.

4 Claims, 7 Drawing Figures

U.S. Patent   May 20, 1986   Sheet 1 of 3   4,589,849
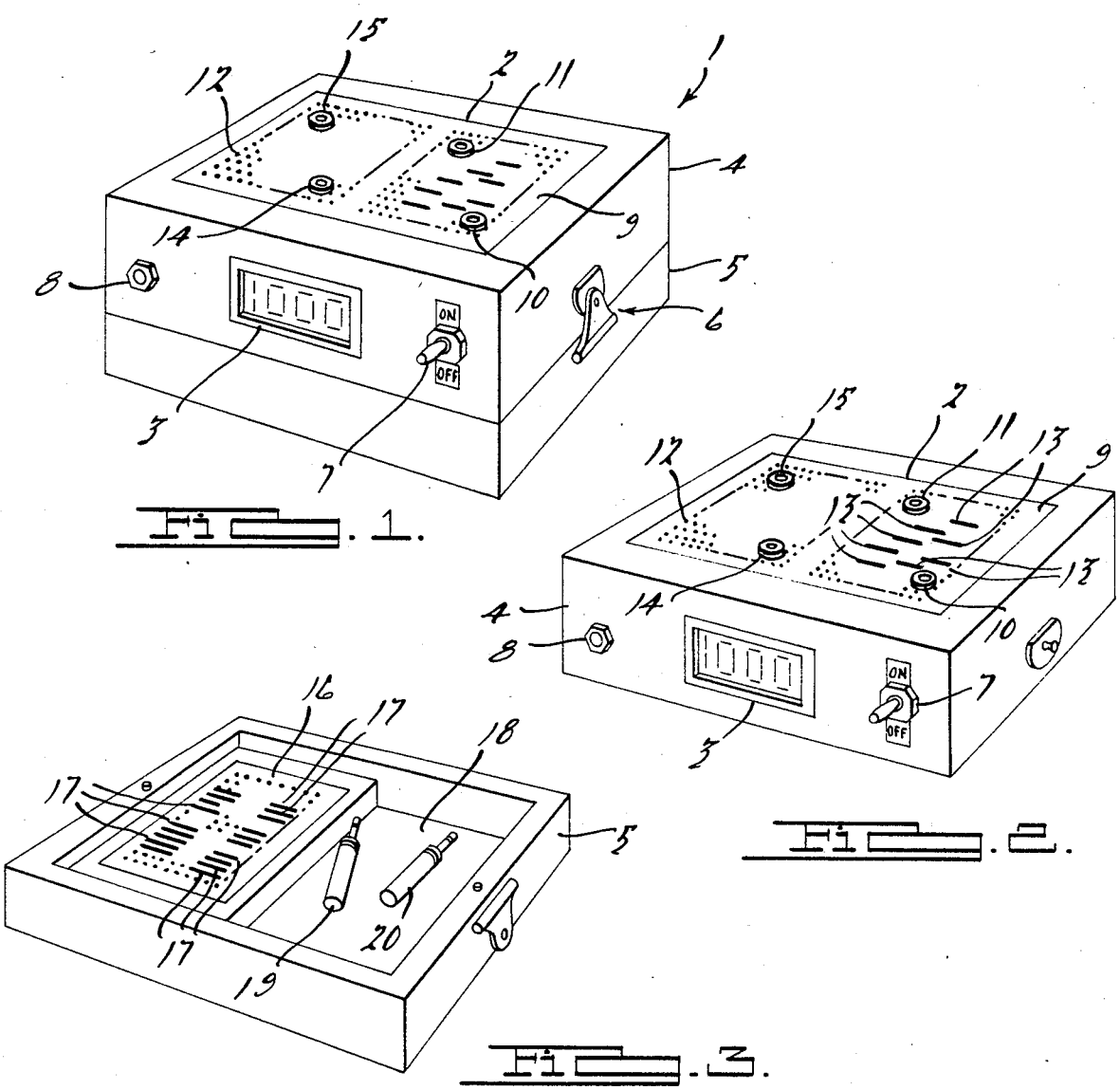
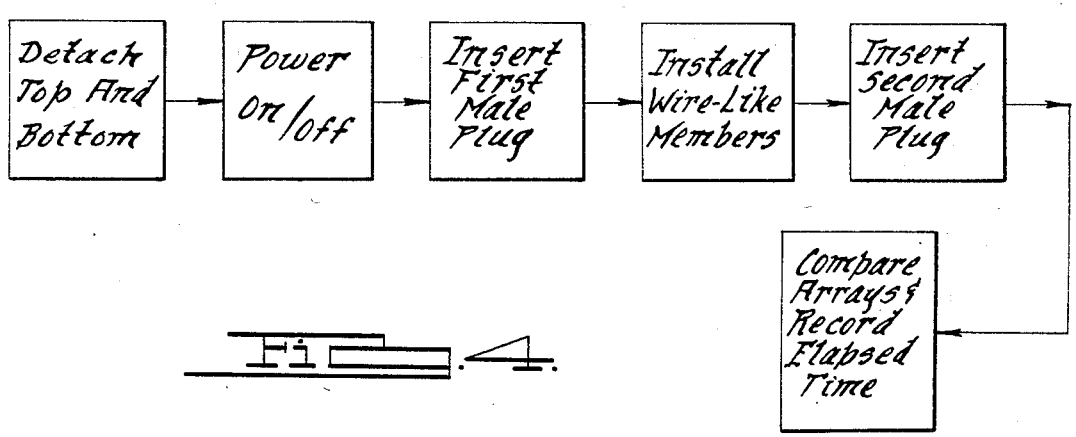

Oscillator Pulse

DEXTERITY EVALUATION APPARATUS

BACKGROUND AND SUMMARY OF THE INVENTION

The present invention is generally related to the testing of an individual's ability to perform manipulations commonly utilized in the assembly of electronic circuit boards. In particular, the invention tests the individual's ability to perform such manipulations by measuring the amount of time required to complete the assembly of a simulated circuit. It is therefore a principal object of the present invention to provide an apparatus which simulates an electronic circuit board and allows the test individual to assemble simulated electronic components thereon while measuring the amount of time required to accomplish the task. The amount of time required to complete the assembly and the complexity of the arrangement of the simulated electronic components serves as indicia of the individual's dexterity. Such indicia of dexterity as determined by this invention may be directly correlated with the type of dexterity required for actual assembly of electronic circuit components. Therefore, the present invention is useful in connection with evaluation for employment and monitoring training progress.

In accordance with the present invention, a housing is provided having a circuit board attached thereto. The circuit board has multiple apertures distributed thereon in a grid-like pattern. The housing has a timer and a digital timer display connected thereto. Also associated with the housing is a quantity of electronic circuit components which must be installed on the circuit board by the individual being tested. The components must be assembled according to a pre-established circuit arrangement assembled on a duplicate circuit board. To begin the dexterity evaluation, the individual to be evaluated starts the digital timer by installing a first male plug in a first female receptacle. Next, the individual installs the circuit components on the circuit board in a pattern corresponding to the duplicate circuit board. Finally, the individual stops the timer by installing a second male plug in a second female receptacle. The display for the timer then provides a measure of the time required by the individual to complete the assembly.

The electronic circuit components may comprise integrated circuit chips, transistors, diodes, capacitors, resistors or wires. The evaluation may be conducted by requiring the circuit components to be installed by hand or by using hand-held pliers.

Additional objects and advantages of the present invention will become apparent from a reading of the detailed description of the preferred embodiment which makes reference to the following set of drawings.

BRIEF DESCRIPTION OF THE DRAWINGS

FIG. 1 is a perspective view of a dexterity evaluating apparatus according to the present invention.

FIG. 2 is a perspective view of the apparatus shown in FIG. 1 with the bottom portion detached.

FIG. 3 is a perspective view of the bottom portion detached from the top housing portion shown in FIG. 2.

FIG. 4 is a flow diagram of the dexterity evaluation process.

FIGS. 5a and 5b are circuit diagrams of the digital timing circuitry according to the present invention; and FIG. 5c is an alternative embodiment of a portion of the control circuit in FIG. 5a.

DETAILED DESCRIPTION OF THE PREFERRED EMBODIMENT

Figures 5A, 5C:
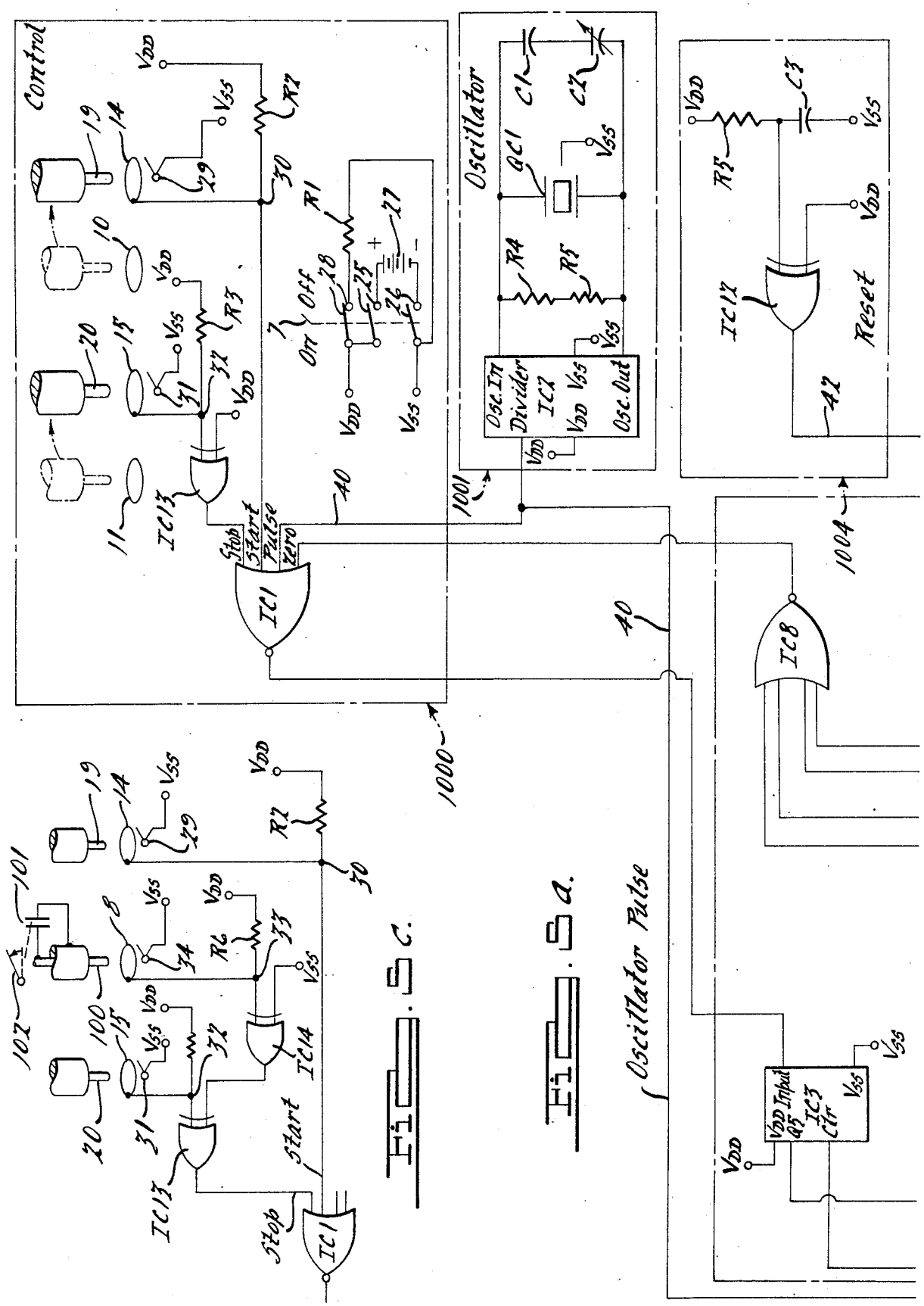

Referring now to the drawings, FIG. 1 illustrates a dexterity evaluation apparatus generally shown at 1 according to the present invention. The apparatus 1 includes a housing having top portion 4 and bottom portion 5, circuit panel 2, and a display 3 for a digital timer contained within the housing. The top portion 4 and bottom portion 5 are releasably secured together by a latch 6. The timer display 3 is preferably mounted on the side of the housing facing the individual completing the dexterity evaluation. The housing 1 has a power control switch 7 and a female electrical receptacle 8 for interconnection to an optional separate dexterity evaluation apparatus to be discussed later.

The circuit panel 2 has two identical arrays of apertures. A first array of apertures 9 has female receptacles 10 and 11 for receiving male plugs. The second array of apertures 12 has an identical arrangement of femal receptacles 14 and 15 for receiving a similar pair of male plugs. The male plugs are used to start and stop the digital timer display 3 according to a circuit and logic means which shall be discussed later.

The first array of apertures 9 has electronic circuit components, shown as 13, installed thereon in a predetermined arrangement. In the preferred embodiment, the electronic circuit components 13 comprise simple jumper wires of varying lengths. The wires have distinguishing indicia, such as color, which uniquely identify wire members of different lengths.

Referring to FIG. 3, the bottom housing portion 5 preferably includes a storage panel 16 for storing a collection of wire members 17 of varying length which will be used by the individual when conducting the dexterity test. Bottom portion 5 also has a storage compartment 18 containing male plugs 19 and 20. The wire members 17 stored on panel 16 are color coded according to length in the same manner as the pre-wired components 13 in the first array 9 illustreatead in FIG. 1.

Figure 5:
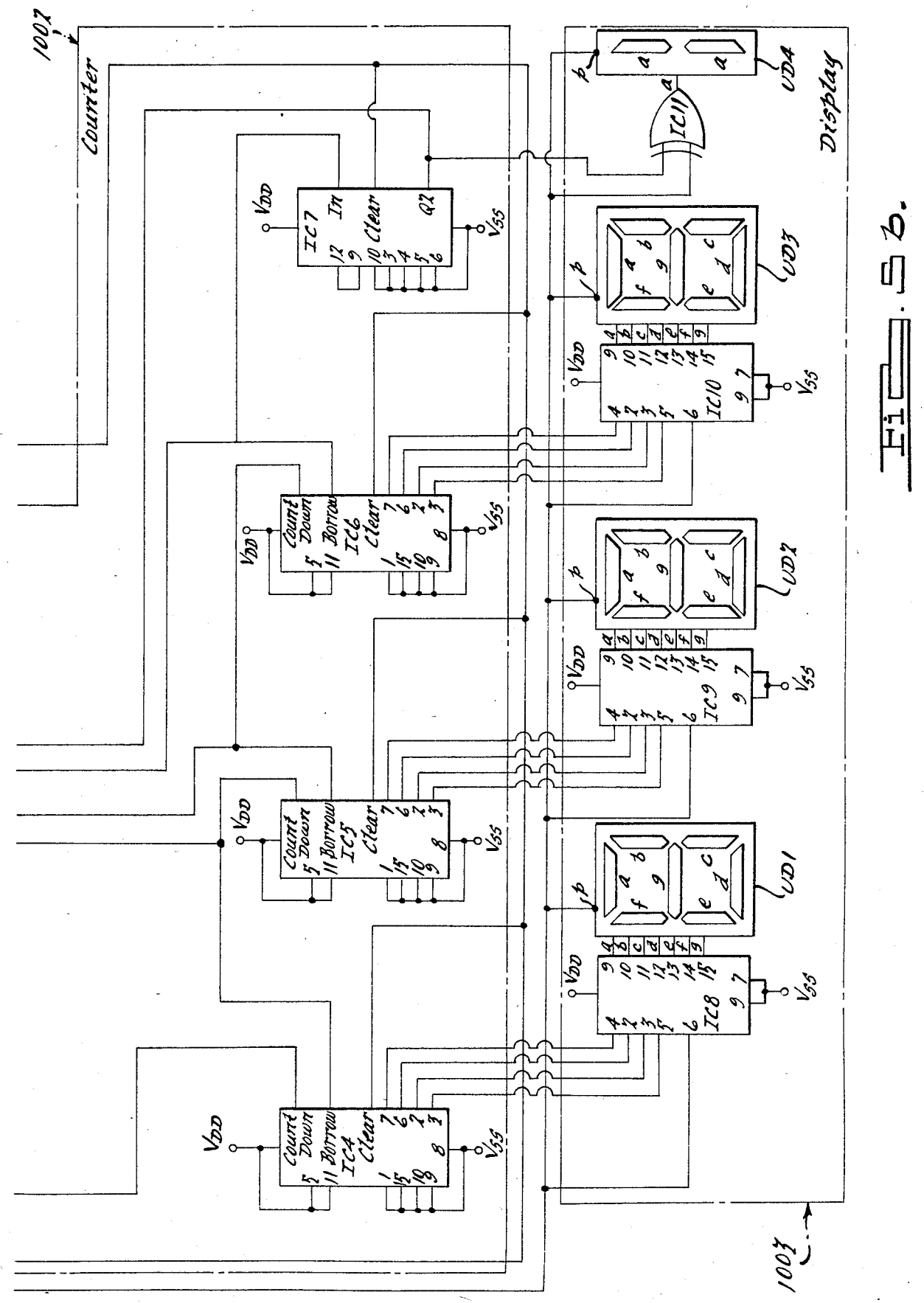

FIG. 5 is a flow diagram of the dexterity evaluation process showing a sequence of steps necessary to utilize the apparatus of this invention. Initially, the top portion 4 is detached from bottom portion 5 by opening latch mechanism 6. The top portion 4 is then placed in front of the individual taking the dexterity test. The male plugs 19 and 20 are removed from storage compartment 18 of the lower housing portion 5 and installed in the female receptacles 10 and 11 in the pre-wired array 9. The power control switch 7 is then turned on which resets the digital timer display 3 to "1000".

The dexterity test is initiated by removing the first male plug 19 from female receptacle 10 and inserting it into female receptacle 14. This also serves to start the digital timer display countdown from "1000". The individual being tested then proceeds to remove the wire members 17 from storage panel 16, and install them in the second array of apertures 12 so as to duplicate the pre-wired arrangement of components 13 installed on the first array of apertures 9. When completed, the individual removes the second male plug 20 from female receptacle 11 and inserts it into female receptacle 15. This stops the digital timer which holds the count at the then current display. The installed wire members 17 in array 12 are then visually checked for correspondence with the pre-wired components 13 in array 9 and the elapsed time recorded.

Referring now to FIGS. 5a and 5b, a circuit diagram of the digital timing circuitry is shown. The timing circuit may be divided into five units, including a control circuit 1000, an oscillator 1001, a counter circuit 1002, a digital display 1003, and a reset circuit 1004. The control circuit 1000 controls the application of the output signal from the oscillator 1001 to the counter circuit 1002 to thereby control the time period during which the counter is decremented. The frequency of the output signal from the oscillator circuit 1001 determines the rate at which the counter circuit 1002 is decremented. The output of the counter circuit 1002 in turn is used to drive the digital display 1003 and the reset circuit 1004 is used to clear the digital display 1003.

The control circuit 1000 includes the power control switch 7, which has three pairs of contacts that are mechanically interconnected. Contact pairs 25 and 26 are both engaged when the power control switch 7 is turned on, thereby connecting the positive terminal of a 9 V D.C. storage battery 27 to $V_{DD}$, and the negative terminal of battery 27 to $V_{SS}$. Contact pair 28 is engaged when the power control switch 7 is turned off thereby connecting $V_{DD}$ to $V_{SS}$ through resistor R1.

The control circuit 1000 further includes a normally open electrical connection between points 29 and 30 that is completed by installing a male plug 19 into female receptacle 14. This provides a path for current flow from $V_{DD}$ through R2 to $V_{SS}$ causing the START input of IC1 to switch from a logic "1" to a logic "0". This serves to start the digital display countdown.

When male plug 20 is installed in female receptacle 15, the electrical connection between points 31 and 32 is completed providing a path for current flow between $V_{DD}$ and $V_{SS}$ through R3. This causes the output of exclusive OR gate IC13 and hence the STOP input to IC1 to switch from a logic "0" to a logic "1". Such a logic change stops the digital timer display countdown.

IC1 comprises a NOR logic gate which serves to control the passage of the output signal from the oscillator circuit 1001 to the counter circuit 1002 and thereby control the starting and stopping of the digital timer. Specifically, when "start" plug 19 has not yet been inserted into receptacle 14 and the START input of IC1 is HI, the output of IC1 is clamped LO regardless of the logic status of the other inputs to IC1. Similarly, when the STOP input of IC1 goes HI upon the insertion of "stop" plug 20 into receptacle 15, the output of IC1 is clamped LO regardless of the logic states of the other inputs to IC1. However, when both the START and STOP inputs are LO, corresponding to "start" plug 19 being inserted int receptacle 14 and receptacle 15 being "open" (assuming also for the moment that the ZERO input to IC1 is also LO), NOR gate IC1 will simply act as an inverter with respect to the oscillator output signal provided to the PULSE input of IC1, thereby effectively allowing the oscillator output signal to pass therethrough.

The oscillator circuit 1001 is adapted to produce a square-wave output signal on line 40 at an appropriate frequency for decrementing the digital counter circuit 1002. The oscillator output signal is generated by a conventional 3.6 MHz quartz crystal oscillator whose output is provided to a programmable CMOS divider circuit IC2 for reducing the frequency of the 3.6 MHz signal to a suitable level. The factor by which IC2 divides the frequency of the 3.6 MHz quartz crystal signal is determined by a tunable RC network comprised of series resistors R3 and R4, capacitor C1, and adjustable capacitor C2. Capacitor C2 in the preferred embodiment is tuned so that IC2 divides the 3.6 MHz oscillator pulse generated by QC1 down to a 60 Hz signal.

The 60 Hz oscillator output signal on line 40 is supplied through NOR gate IC1 to the input of a 7-stage ripple-carry binary counter IC3. Counter IC3 further divides the frequency of the oscillator signal down to 1.8 Hz. The 1.8 Hz output signal from counter IC3 is in turn provided to the input of the first stage IC4 of a 4-stage digital counter circuit IC4–IC7. The first three stages IC4–IC6 of the digital counter circuit comprise 4024 synchronous 4-bit up/down decade counters. The fourth stage IC7 comprises a D-type flip-flop. IC4 provides the "ones" count, IC5 provides the "tens" count, IC6 provides the "hundreds" count, and IC7 provides the "thousands" count. When the counter begins a cycle, IC4 starts with a zero and counts down to the BCD equivalent of a nine, whereupon a borrow pulse is generated at IC4 BORROW. IC4 BORROW is connected to IC5 COUNT DOWN. IC5 also starts with a zero and counts down upon receipt of each borrow pulse from IC4 to the BCD equivalent of a nine, whereupon IC5 generates a borrow pulse at IC5 BORROW. IC5 BORROW is connected to IC6 COUNT DOWN. IC6 also starts with a zero, and counts down upon receipt of each borrow pulse from IC5 to the BCD equivalent of a nine, whereupon IC6 generates a borrow pulse at IC6 BORROW. IC6 BORROW is in turn connected to IC7 IN. Flip-flop IC7 produces a logic "1" at its Q2 output upon receipt of a HI signal at its CLEAR input and a logic "0" at its Q2 output upon receipt of a HI borrow signal from IC6 at its IN input.

The BORROW outputs of counters IC4–IC6 together with the Q2 output of flip-flop IC7 are provided to the inputs of a 4-input NOR logic gate IC8. The output of NOR-gate IC8 will therefore go HI when all of the inputs thereto are a logic "0". This condition will occur when the count on IC4, IC5, IC6, and IC7 reaches the BCD equivalent of the base ten digit "0000". A logic "1" is then generated at the output of NOR-gate IC8 which is in turn provided t0 the ZERO input of NOR-gate IC1. As previously discussed, a logic "1" at any one of the inputs to IC1 effectively clamps the output of IC1 at a logical "0" and prevents the passage of the oscillator output signal on line 40 to the digital counter portion of the circuit. Thus, if the dexterity evaluation test is not completed within the time it takes for the digital timer to count down to "0000", then the digital timer is automatically halted and the test procedure terminated.

When the dexterity evaluation is completed prior to the timer count reaching the base ten digit "0000", by virtue of the test individual inserting male plug 20 into female receptacle 15, the completed electrical connection between 31 and 32 produces a logic "1" at the STOP input to IC1, thereby inhibiting further countdown of the digital counter portion of the circuit.

The display portion of the circuit includes IC8, IC9, and IC10, which comprise 4055 BCD-to-7-segment DECODER/DRIVERS. Thus, IC8, IC9, and IC10 each convert a single digit BCD input to a base ten digit which is then illuminated by the seven segment digital display units UD1, UD2, and UD3.

The "thousandths" count in the display is provided by digital segment display element UD4. Since the display when initialized is set to the number "1000" and counted down therefrom, a full 7-segment display is not needed for the thousandths count. Display element UD4 is driven by the output of an exclusive-OR gate IC11 which has a first input connected to the Q2 output of flip-flop IC7 and a second input connected to receive the 60 Hz oscillator signal on line 40.

When IC7 receives a RESET signal, the Q2 output of IC7 goes HI. When the 60 hertz oscillator pulse on line 40 is also HI, a logic "1" is produced at the second logic input to IC11 and the output of IC11 goes LO. When the 60 hertz oscillator pulse is a logic "0", a logic "0" is produced at the second logic input to IC11 and the output of IC11 goes HI. Thus, when the first logic input to IC11 from th Q2 output of IC7 is a logic "1", the output of IC11 comprises a 180 degrees phase shift of the 60 hertz oscillator pulse on line 40. If the first logic input to IC11 from the Q2 output of IC7 is a logic "0", then the output of IC11 will duplicate the 60 hertz oscillator pulse.

Digital segment display UD4 produces a visual digit "1" when the frequency supplied at UD4-P is 180 degrees out of phase with the frequency supplied at UD4-a. UD4 appears blank when the frequencies are in phase. The frequencies are 180 degrees out of phase when the Q2 output of IC7 is a logic "1". When IC7 receives a first borrow pulse from IC6, the Q2 output of IC7 goes LO and the frequencies become in phase as previously described, resulting in a blank display at UD4.

IC3, IC4, IC5, IC6, and IC7 are reset by a logic "1" supplied to the respective CLEAR pins of the individual elements. A momentary RESET signal is produced by reset circuit 1004 each time the power control switch 7 is turned on. Reset circuit 1004 includes an exclusive-OR logic gate IC12 which has a first input connected to $V_{DD}$ through a resistor R5 and to $V_{SS}$ through a capacitor C3. The second input to IC12 is directly connected to $V_{DD}$, thereby resulting in a continuous logic "1" at the second input to IC12.

When the power control switch 7 is initially turned on, current flows between $V_{DD}$ and $V_{SS}$ through resistor R5 and capacitor C3. The initial voltage change across capacitor C3 is sufficiently small to produce a logic "0" at the first input to IC12. Therefore, with a logic "0" at the first input to IC12 and a logic "1" at the second input to IC12, the output of IC12 becomes a logic "1". This logic "1" serves as the RESET signal on line 42. As capacitor C3 becomes fully charged, the voltage change thereacross increases, resulting in a logic "1" at the first input to IC12. This change in the logic state of the first input to IC12 results in a logic "0" at the output of IC12, thereby terminating the RESET signal on line 42. When power control switch 7 is turned off, $V_{DD}$ and $V_{SS}$ are connected through resistor R1 thereby draining any charge which may be stored in capacitor C3. Thus, each time the power control switch 7 is cycled, the RESET pulse on line 42 is produced.

In another embodiment of the invention, the control portion 1000 of the circuit includes an additional female electrical connection 8 best seen in FIG. 1 which permits connection of the timer circuit to other testing apparatus, such as a separate dexterity evaluation device. The separate dexterity evaluation device is connected to the timer circuit by inserting a male electrical connector 100 into female receptacle 8. Referring to FIG. 5c, the timing circuit can be controlled by a separate dexterity testing device (not shown) by means of an electrical switch 101 associated with the device which may, for example, be actuated by the opening and closing of a lid 102 on the device. Opening of the lid switch 101 would therefore serve to initiate the digital display countdown and closing of the lid switch 101 would serve to terminate the digital display countdown.

The circuit embodiment shown in FIG. 5c consists of a modification of the control circuit portions producting the signal provided to the STOP input to IC1. The remainder of the circuit operates in the same manner as that described above. When the separate dexterity evaluation device is used, male plug 19 is installed in female receptacle 14 to produce a logic "0" at IC1 START, and male plug 20 is installed in female receptacle 15 to produce a logic "0" at the first logic input to exclusive OR gate IC13. The second logic input to IC13 is modified from the circuit embodiment previously discussed. The second logic input to IC13 is now the logic output of exclusive OR gate IC14.

The first logic input to IC14 is connected to $V_{SS}$ thereby establishing a continuous logic "0". The second logic input to IC14 is initially connected to $V_{DD}$ through a resistor R6, thereby providing a logic "1" at the second input to IC14 and resulting in a logic "1" being provided at the output of IC14. When switch 101 is closed, an electrical connection is completed between points 33 and 34 establishing a path between $V_{DD}$ and $V_{SS}$ through resistor R6, resulting in a logic "0" at the second input to IC14. With both logic inputs to IC14 at a logic "0", the output of IC14 becomes a logic "0". With both logic inputs to IC13 at a logic "0", the output of IC13 similarly becomes a logic "0", thereby providing a logic "0" signal to IC1 STOP. With IC1 STOP, IC1 START, and IC1 ZERO at logic "0", IC1 output will allow the oscillator output to pass therethrough starting the digital timer countdown. When the lid switch 101 is opened, breaking the electrical connection between 33 and 34, the second logic input to IC14 becomes a logic "1" and the output of IC14 changes to a logic "1". When the output of IC14 is a logic "1", the second input to IC13 also becomes a logic "1" which in turn changes the output of IC13 to a logic "1". A logic "1" at the output of IC13 results in a logic "1" at IC1 STOP which clamps the output of IC1 to a logic "0", thereby preventing the passage of the oscillator output signal to the counter portion of the circuit and stopping the digital timer countdown.

When the circuit embodiment including the modification illustrated in FIG. 5c is used without the separate apparatus, male plug 19 and male plug 20 are used to control the timer circuit according to the sequence described for the circuit embodiment previously described.

While the above description constitutes the preferred embodiments of the present invention, it will be appreciated that the invention is susceptible to modification, variation, and change without departing from the proper scope or fair meaning of the accompanying claims.

I claim:

1. An apparatus for assisting in the evaluation of the dexterity of an individual comprising a circuit board comprising first and second adjoining arrays of apertures, the first of said arrays being pre-wired to establish the wiring pattern for said second array;

signal circuit means connected to said circuit board and responsive to the actuation of a first switch means by the individual for producing a START signal and further responsive to the actuation of a second switch means by the individual after said second array has been wired for producing a STOP signal; and digital timing means for monitoring and displaying the period of time required by the individual to complete the wiring of said second array including timer circuit means for driving a digital display and control circuit means responsive to said START signal for initiating said timer circuit means and further responsive to said STOP signal for inhibiting said timer circuit means.

2. The apparatus of claim 1 wherein said arrays are wired with jumper wires of varying lengths which are color-coded according to length.

3. The apparatus of claim 1 wherein said first and second switch means comprise first and second female receptacles located on said second array, and said signal circuit means produces said START and STOP signals in response to the insertion by the individual of male connectors into said first and second female receptacles, respectively.

4. The apparatus of claim 1 further including a housing comprising a top portion having said circuit board located thereon and a bottom portion removable from said top portion for exposing in said bottom portion a second circuit board having an array of apertures formed therein for storing a plurality of jumper wires of varying length to be used by the individual to wire said second array, said top portion further containing said digital timing means.

* * * * *